(12) United States Patent
Devaraj et al.

(10) Patent No.: US 12,336,050 B2
(45) Date of Patent: Jun. 17, 2025

(54) SYSTEM AND METHOD TO FACILITATE A PUBLIC SAFETY INCIDENT INVESTIGATION

(71) Applicant: MOTOROLA SOLUTIONS, INC., Chicago, IL (US)

(72) Inventors: Amarnath Devaraj, Elk Grove Village, IL (US); David A Lill, Riverside, IL (US)

(73) Assignee: MOTOROLA SOLUTIONS INC., Chicago, IL (US)

( * ) Notice: Subject to any disclaimer, the term of this patent is extended or adjusted under 35 U.S.C. 154(b) by 396 days.

(21) Appl. No.: 18/061,157

(22) Filed: Dec. 2, 2022

(65) Prior Publication Data

US 2024/0188188 A1 Jun. 6, 2024

(51) Int. Cl.
*H04W 76/50* (2018.01)
*G06F 21/62* (2013.01)
*G08B 25/01* (2006.01)
*H04W 12/082* (2021.01)

(52) U.S. Cl.
CPC ............ *H04W 76/50* (2018.02); *G06F 21/62* (2013.01); *G08B 25/016* (2013.01); *H04W 12/082* (2021.01); *G06F 2221/2141* (2013.01)

(58) Field of Classification Search
CPC ..... H04W 76/50; H04W 12/082; G06F 21/62; G08B 25/016
USPC .................................. 455/404.1; 379/37–52
See application file for complete search history.

(56) References Cited

U.S. PATENT DOCUMENTS

| | | | |
|---|---|---|---|
| 9,510,172 B2 | 11/2016 | Schuler et al. | |
| 10,320,884 B2 | 6/2019 | Marfera et al. | |
| 11,528,256 B1 | 12/2022 | Wojcik et al. | |
| 2005/0075116 A1* | 4/2005 | Laird | A61B 5/1117 455/414.1 |
| 2005/0101334 A1 | 5/2005 | Brown et al. | |
| 2010/0262367 A1* | 10/2010 | Riggins | G08B 25/016 455/500 |
| 2012/0218102 A1* | 8/2012 | Bivens | G08B 25/003 340/539.11 |
| 2016/0286156 A1 | 9/2016 | Kovac | |

FOREIGN PATENT DOCUMENTS

WO 2014048299 A1 4/2014

* cited by examiner

*Primary Examiner* — Maria El-Zoobi
(74) *Attorney, Agent, or Firm* — Barbara R Doutre (57) ABSTRACT

A method and system of engaging civilian participation in an incident scene investigation are provided, by registering a civilian communication device with a public safety server of a public safety agency; and granting access permission, from the PS server, for the registered civilian device to remotely control activation of a deactivated public safety communication device, such as a public safety body worn camera (PS BWC) at the incident scene.

23 Claims, 6 Drawing Sheets

SYSTEM AND METHOD TO FACILITATE A PUBLIC SAFETY INCIDENT INVESTIGATION

FIELD OF THE INVENTION

The present invention relates generally to communication systems and more particularly to enhancing public safety incident scene investigations through civilian communication devices.

BACKGROUND

Witness testimony and witness-captured video recordings can be very useful to public safety incident scene investigations. However, investigative challenges arise as some witnesses leave an incident without meeting with law enforcement, for example believing that there are a sufficient number of other witnesses or being reluctant or indifferent to identify themselves to law enforcement. The lack of witnesses and lack of potential witness video footage may thus hinder an investigation, particularly in cases where law enforcement cameras may not have been activated. An incident investigation may include not only gathering information pertaining to the incident itself but also post incident handling investigation processes. Proper post-incident investigative procedures help ensure that evidence is properly collected and preserved and that actions are taken in accordance with standard operating procedures (SOP). Some witnesses may not be aware that their video footage may contain important investigative information, pertaining to the incident itself and/or and the post incident investigation process.

Accordingly, it would be highly beneficial to facilitate the incident scene investigation process.

BRIEF DESCRIPTION OF THE FIGURES

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, there is provided herein a method and system of engaging civilian participation at an incident scene, by registering a civilian communication device with a public safety (PS) server of a public safety agency; and granting access permission, from the PS server, for the registered civilian device to remotely control activation of a deactivated public safety device. The public safety device may include a public safety camera device, such as a public safety body worn camera (PS BWC) and/or in-vehicle camera at the incident scene.

The embodiments provide for a public safety server that supports a method and system for registering civilian communication devices, and receiving and managing multimedia input received from one or more civilian communication devices as part of an incident scene investigation. The method and system embodiments for engaging civilian participation in the incident scene investigation include: registering a civilian communication device with a public safety server of a public safety agency; and granting access permissions (privileges), from the PS server, for the registered civilian device to communicate with predetermined PS devices of the PS agency. The civilian communication device may request an incident ID assignment from the PS server, the request containing device metadata identifying time, date, and incident location. The request further includes at least one of: self-identification of the civilian as a witness to an incident; and availability of multimedia footage pertaining to the incident. Upon receipt of the assigned incident ID, the registered civilian communication device begins retrieving incident information based on access permissions granted for the incident ID, the retrieved incident information including automated monitoring of PS device activation and deactivation. The civilian communication device then transmits the retrieved incident information, along with any multimedia recorded, back to the server for incident analytics.

The automated monitoring of PS device activation and deactivation may include monitoring, by the civilian communication device, the activation and deactivation of PS BWCs at the incident scene and/or the activation/deactivation of PS in-vehicle cameras at the incident scene. The registered civilian communication device may remotely trigger activation of a currently deactivated public safety BWC at the incident scene. The remote trigger of the registered civilian communication device may be controlled by the PS server based on real-time incident analytics. Multimedia footage obtained by the registered civilian communication device may be compiled by the PS server to fill in multimedia footage gaps caused by the deactivated public safety BWC and/or deactivated PS in-vehicle camera.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1A:
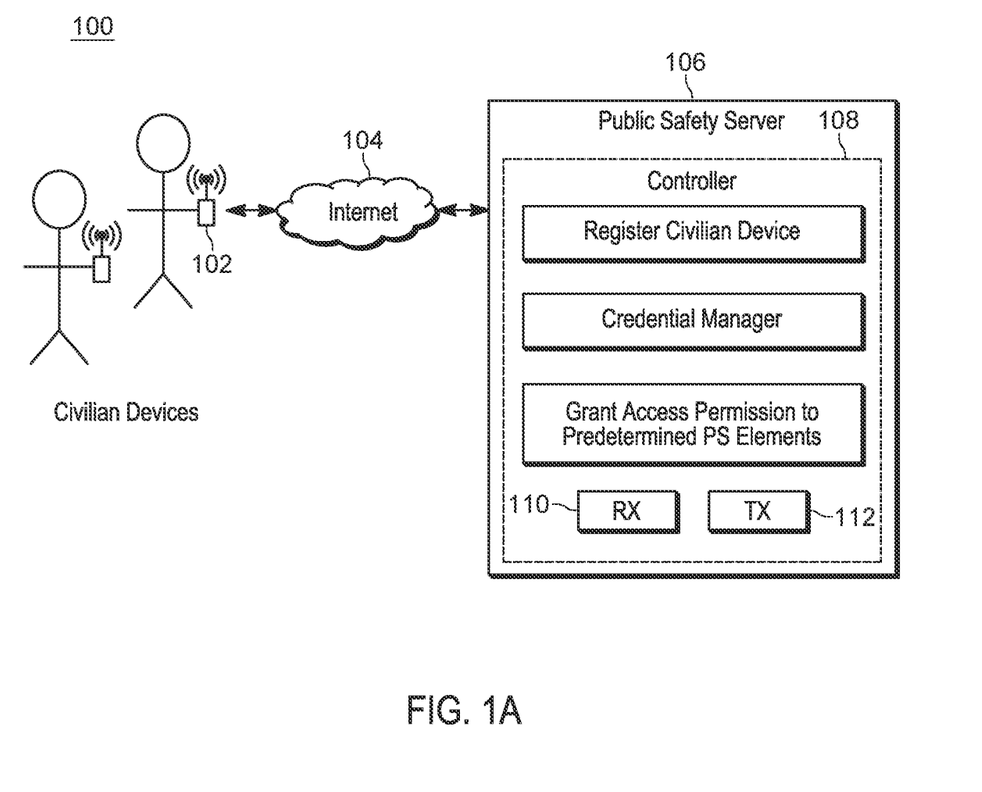
FIG. 1A is a first embodiment of a communication system diagram formed and operating in accordance with some embodiments.

FIG. 1A is a first embodiment of a communication system 100 formed and operating in accordance with some embodiments. The communication system 100 operates by registering a civilian communication device 102 with a public safety server 106 of a public safety agency, and followed by granting access permission, from the PS server 106, for the registered civilian communication device 102 to communicate with predetermined PS devices of the PS agency associated with the PS server 106. The PS server 106 includes known server components such as a controller 108 having one or more processors and multimedia manager, as well as a receiver 110 and a transmitter 112, the controller being configured for the above operations.

The civilian communication device 102 may be for example, a cell phone, tablet or other multimedia device operated by a civilian. The civilian communication device includes a processor, transmitter, receiver, and video camera (not shown). The civilian communication device 102 may wirelessly interconnect, over an internet public safety portal 104, for registration to the public safety server 106.

The registration of the civilian communication device 102 may include verification and security measures to ensure that only approved devices are registered with the PS server 106. Registration of the civilian communication device 102 may take place prior to an incident or in real-time during an incident or during an incident investigation. The PS server 106 may further include a feature for registering the civilian communication device across other public safety agencies over different jurisdictions.

Figure 1B:
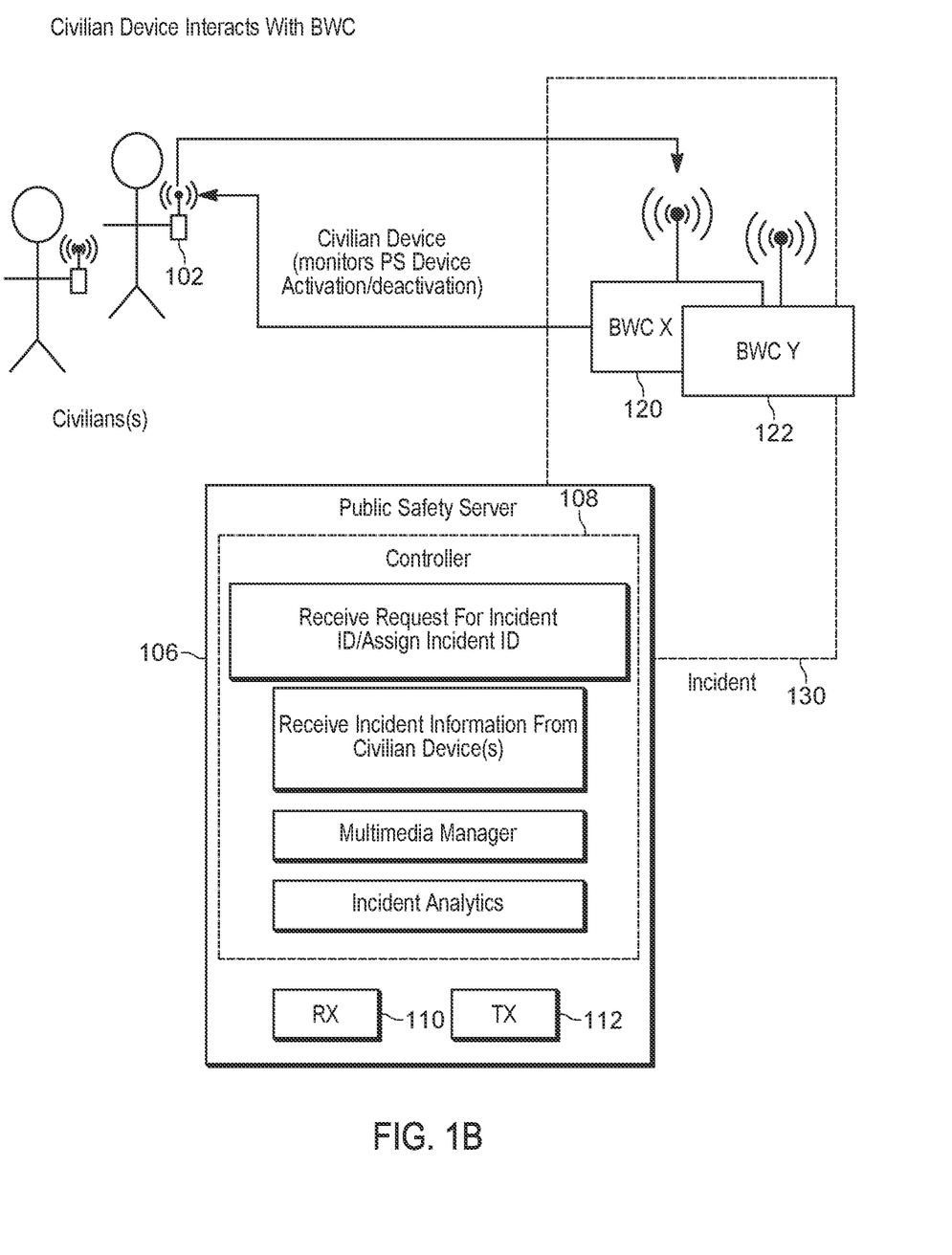
FIG. 1B is a second embodiment of the communication system of FIG. 1A formed and operating in accordance with some embodiments.

FIG. 1B is a second embodiment of operation of the communication system of FIG. 1A in which the civilian communication device 102 is at an incident scene 130, and the predetermined PS devices are public safety camera devices, such as public safety body worn camera(s) 120, 122 (PS BWCs) and/or public safety in-vehicle cameras (not shown) located at the incident scene. Throughout the application, it is to be appreciated examples referring to a PS BWC may also be applied to public safety in-vehicle camera as well. In this embodiment, the communication system 100 preferably operates by granting access permission, from the PS server 106, for the registered civilian communication device 102 to remotely control activation of a deactivated public safety (PS) camera device, such as public safety BWC 120 and/or BWC 122 and/or public safety in-vehicle camera at the incident scene. The remote activation of a deactivated public safety BWC by the registered civilian communication device 102 may take at incident scene 130. Incident scene 130 may be a real-time incident in which one or more public safety BWC(s) 120, 122 are present and/or an incident investigation at the scene where one or more public safety BWC(s) are present. The remote activation of the public safety BWC(s) 120, 122 by the registered civilian communication device 102 may occur automatically, without requiring civilian interaction with either device. The remote activation of a deactivated public safety body worn camera can advantageously ensure compliance with standard operating procedures (SOP) for different incident types that require that the public safety BWC be turned on.

Hence in FIG. 1A the communication system 100 is focused on the registration and granting of access permissions to the civilian communication device 102, which may occur prior to an incident, during an incident, and/or during an incident investigation at the incident scene, FIG. 1B represents the operation of communication system 100 either during an incident, and/or during an incident investigation at the scene, where registered civilian communication device(s) 102 are located within an appropriate range for communication with the predetermined elements of the PS system to which permissions were granted. The appropriate range for communication may be determined using proximity sensors, signal strength indicators, and geofencing of the incident area by the registered civilian communication device. The processor of the public safety server 106 is further configured to receive a request for incident ID assignment, from the civilian communication device 102. The incident ID request includes civilian device metadata identifying time, date, and incident location, and further including self-identification of the civilian as a witness to an incident and availability of multi-media footage pertaining to the incident. The processor of PS server 106 is further configured to assign an incident ID, to the registered civilian device, in response to the request. If there are multiple civilian videos, a grouping of incident IDs may be formed. The PS server 106 may then receive incident information tagged with the incident ID from the registered civilian communication device 102, the incident information including monitored data obtained from automated monitoring of PS device activation/deactivation information. The PS server 106 may perform analytics on the PS device activation/deactivation information, for example to compare to a standard operating procedure (SOP). Multimedia footage obtained by the registered civilian communication device may be uploaded to the PS server 106 (or retrieved by the server) to help fill in multimedia gaps caused by the deactivated PS device, such as gaps in video footage from a deactivated public safety BWC and/or deactivated public safety in-vehicle camera.

In addition to the automated monitoring and analytics of PS device activation/deactivation information, multimedia footage may be uploaded by the civilian communication device to the public safety server (or retrieved from the server) for incident analytics to be performed thereon. The multimedia footage may potentially include images of additional witnesses to the incident and/or witnesses to the post incident investigation. The video analytics performed on the footage may apply artificial intelligence (AI) to tag potential witnesses. In some embodiments, a face recognition dataset size can be limited to images matched to the civilian communication device that interacted with the PS server, and thereby quickly tag these images. Additionally, determining location, placement and/or movement of the civilian communication device based on interaction with the PS server may be beneficial to an investigation, particularly when there are multiple videos from different registered civilian communication devices at different locations of the incident scene.

Figure 2:
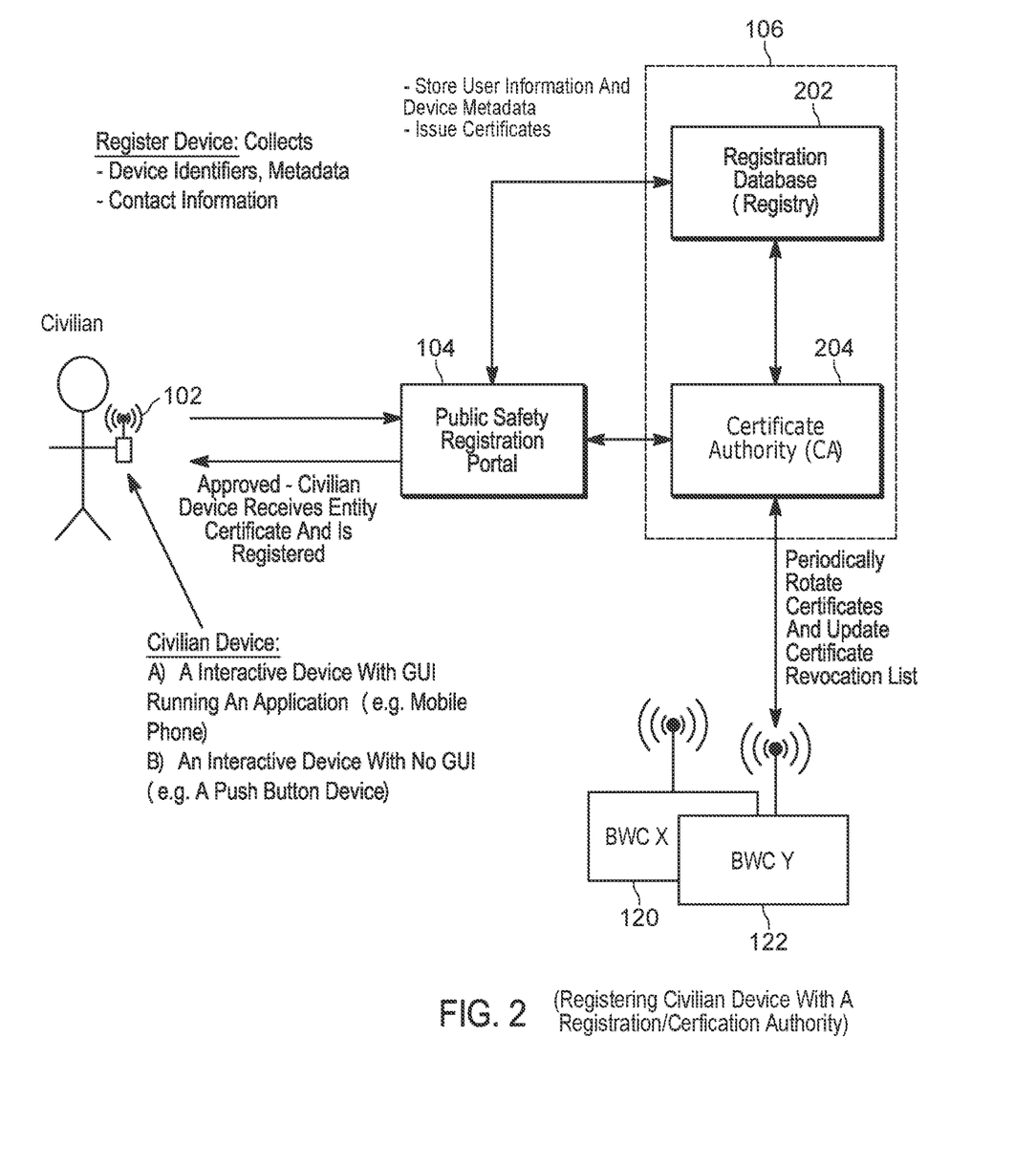
FIG. 2 is an example of registering a civilian communication device with a registration/certificate authority in accordance with some embodiments.

FIG. 2 is an example of registering the civilian communication device 102 (e.g. cell phone, tablet) with a registration/certificate authority in accordance with some embodiments. The civilian communication device 102 may initiate a registration request over the internet public safety portal 104 to a registration database 202—of public safety server 106. The registration may include uploading of civilian device identifiers, civilian device metadata, and civilian contact information. Upon verification and approval; the user information, device metadata, and contact information will be stored at registration database 202. The certificate authority (CA) 204 will then transfer a civilian device certificate which could be validated by predetermined public safety devices, such as PS BWCs 120, 122, of the communication system. Registered devices having valid certificates may be granted access permissions, from the PS server 106, to communicate with predetermined elements of the PS agency, such as PS BWCs 120, 122, during a public safety incident. The access permission may include monitoring, PS BWC activation and deactivation by the registered civilian communication device 102. The approved registration of civilian communication device 102 may further include providing an interactive user interface to use as a communication interface to the public safety server 106. Alternatively, an approved registration may include reconfiguring a push button or other interface on the civilian communication device to use as a communication interface to the public safety server. While certificate based authentication and authorization has been described as a mechanism to authenticate and authorize the civilian communication device with the PS server 106, it is also understood that other approaches could be used to authenticate and authorize civilian communication devices.

Figure 3:
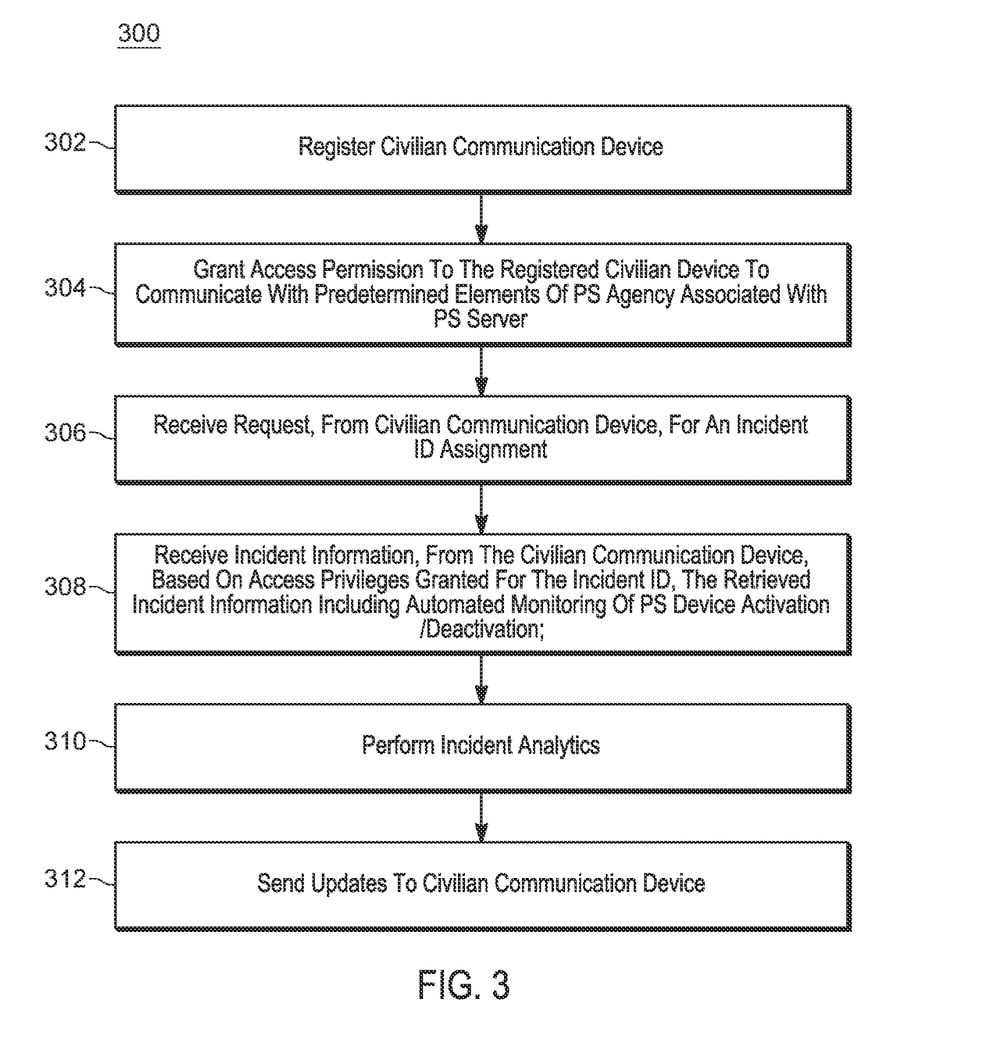
FIG. 3 is a flowchart of a method, viewed from the public safety server perspective, for enabling a civilian device to participate in an incident scene investigation in accordance with some embodiments.

FIG. 3 is a flowchart of a method 300, viewed from the public safety server perspective, for enabling a civilian device to participate in an incident investigation in accordance with some embodiments. The public safety server processing is configured at 302 to register a civilian communication device with the PS agency server and grant access permission for the registered civilian communication device at 304 to communicate with predetermined elements of a PS agency associated with the PS server.

Once the civilian device is registered and access permissions granted, the server is further configured at 306 to receive a request for incident ID assignment, from the registered civilian communication device. The incident ID request may include civilian device metadata identifying time, date, and incident location, and may further include self-identification of the civilian as a witness to an incident and availability of multimedia footage pertaining to the incident. The server then assigns an incident ID, to the registered civilian device, in response to the request, which allows the server to receive, at 308 incident information tagged with the incident ID from the civilian communication device. The incident information includes monitored data obtained by the registered civilian device of the public safety device based on the granted access permissions. The automated monitoring preferably includes automated monitoring of PS device activation/deactivation information. The PS server 106 may then perform, at 310, incident analytics on the PS device activation/deactivation. For example, the PS device being monitored may be a public safety body worn camera (BWC) and the analytics include comparing the public safety BWC activation/deactivation data to standard operating procedures (SOP) for the incident type. Additionally, recorded video footage with accompanied metadata from a plurality of registered civilian communication devices may be compiled and video analytics performed thereon at the server and compared to SOPs associated with the PS agency. The method continues at 312, by sending updates to the registered civilian communication device. Those updates may include instructions to remotely activate a currently deactivated public safety BWC, for example to ensure compliance with the SOP.

Figure 4:
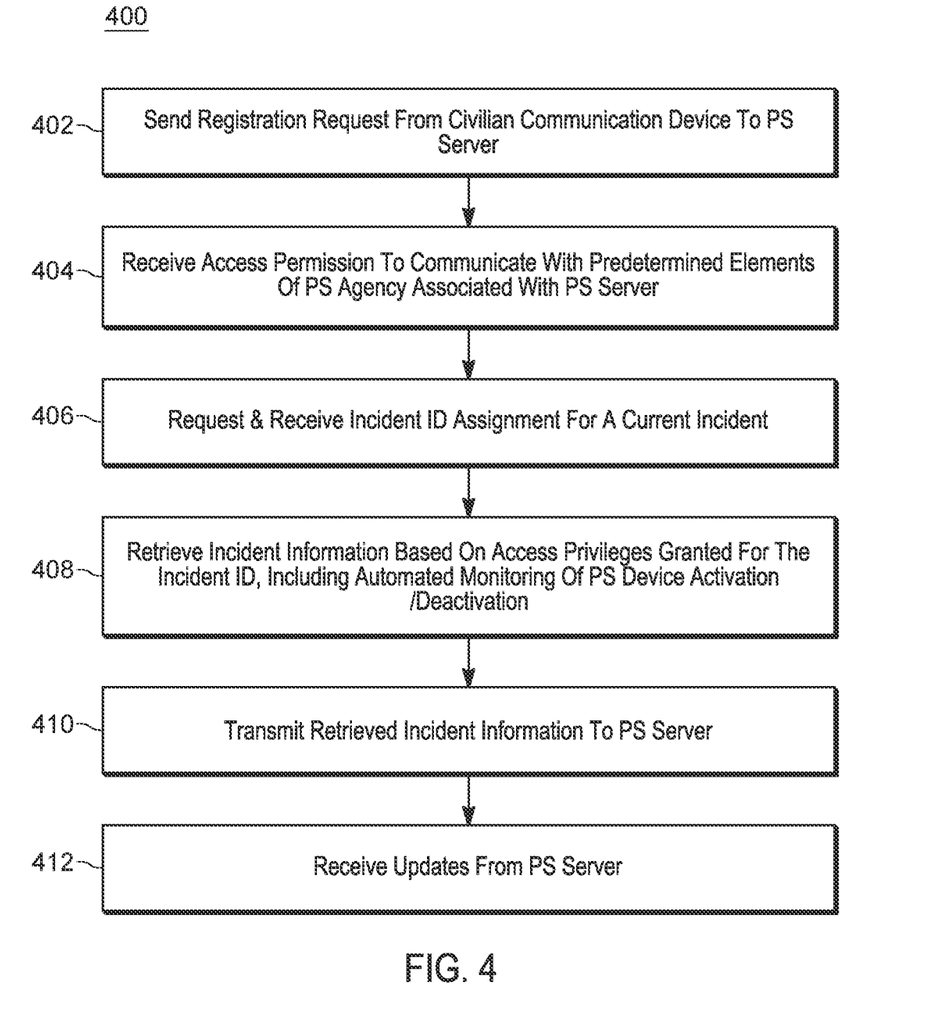
FIG. 4 is a flowchart of a method, viewed from the civilian communication device perspective, for enabling a civilian device to participate in an incident scene in accordance with some embodiments.

FIG. 4 is a flowchart of a method 400, viewed from the civilian communication device perspective, for enabling the civilian device to participate in an incident investigation in accordance with some embodiments. The method begins at 402 with sending a registration request from the civilian communication device to the public safety server associated with a public safety agency. At 404, the civilian communication device receives access permission, granted by the PS server, to monitor predetermined elements of the PS agency. The civilian communication device is further configured at 406 to request and receive an incident ID assignment for a current incident from the PS server. The request may contain device metadata identifying time, date, and incident location, self-identification of the civilian as a witness to an incident and availability of multimedia footage pertaining to the incident.

Once the incident ID assignment for the incident is received at 406. The method continues at 408 within the civilian communication device retrieving incident information based on the access permissions granted for the incident ID. The retrieved incident information includes automated monitoring of PS device activation/deactivation taking place at the incident. For example, the automated monitoring may include automated monitoring of a public safety body worn camera (BWC) activation and deactivation.

The method continues to 410 by transmitting the incident ID in conjunction with retrieved incident information from the registered civilian communication device back to the PS server for incident analytics. Updates may be received from the public safety server at 412. Such updates may include remote control activation of a currently deactivated public safety device, such as the public safety BWC.

Figure 5:
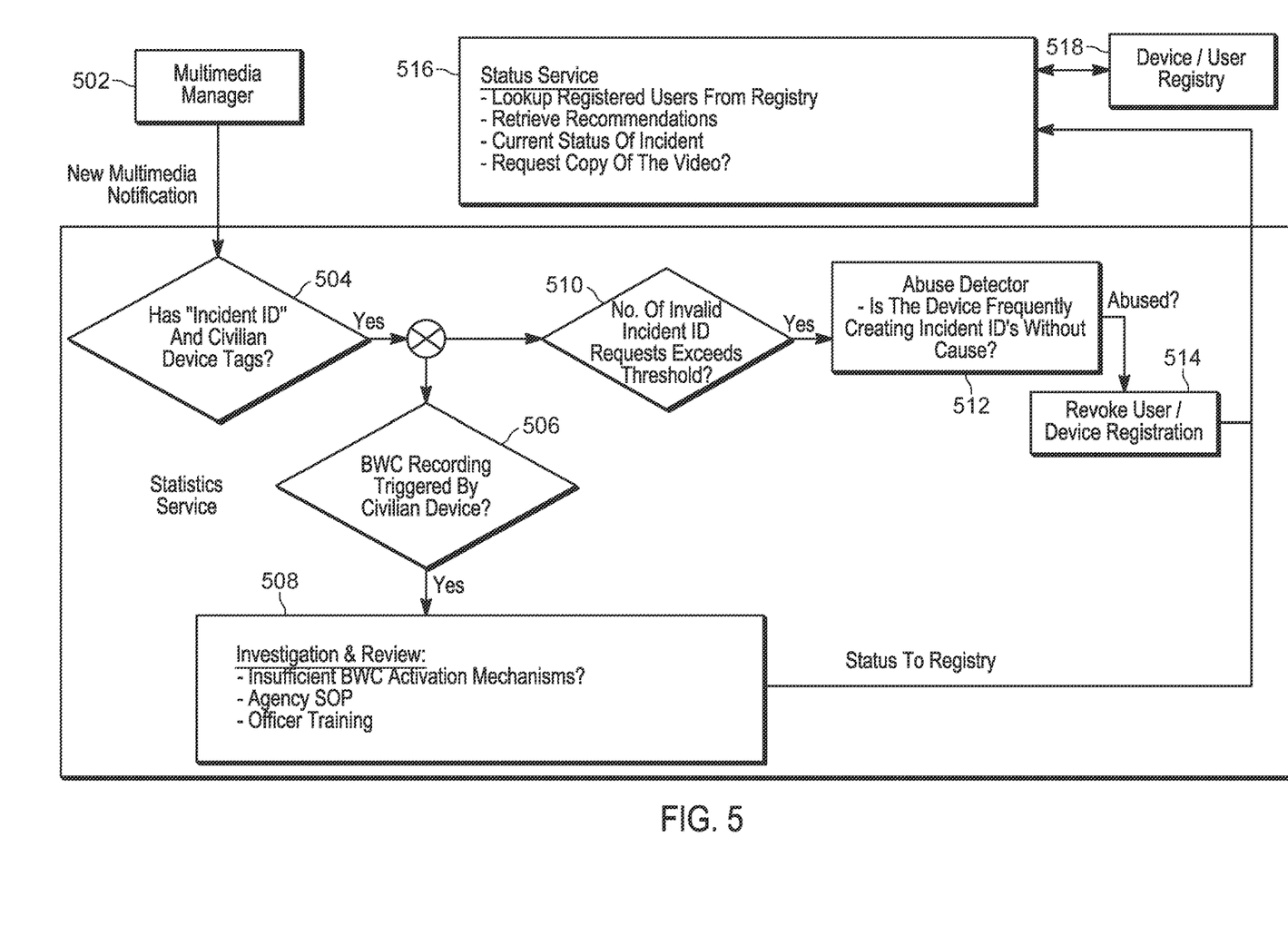
FIG. 5 shows an example of statistical services workflow provided by the public safety server in accordance with some embodiments.

FIG. 5 shows an example of a statistical services workflow provided by the public safety server 106 in accordance with some embodiments. The server's controller 108 may include a multimedia manager as part of its processing capabilities which verifies at 504 that an incoming multimedia notification includes a valid incident ID associated with a registered civilian communication device. If a public safety device, such as a public safety BWC, was triggered remotely by the registered civilian device at 506, then follow up investigation and review of the monitored data can take place at 508. For example, investigation and review at 508 may help identify faulty BWC activation mechanism, identify a need for agency SOP updates, identify a need for officer training, to name a few.

Statistical services can also be run on the registered civilian communication device and its user. For example, an excessive amount of invalid incident ID requests at 510 may be indicative of a potential abuser at 512 whose device registration may be revoked at 514. Hence, the statistical workflow allows for the automatically revoking access permission to the civilian communication device in response to exceeding an invalid incident ID request threshold.

The investigation and review results for a plurality of incidents and public safety devices and registered civilian devices may be stored in a status service database 516 for further periodic review and comparison to identify any long term need for updates to overall agency systems. The statistical results, reviews and recommendations pertaining to the incident(s), public safety devices and registered civilian devices may be accessed via a device/user registry 518.

The system and method of the various embodiments may facilitate the investigative process in several ways. For example, the civilian communication device may be used to indicate a user's willingness to be a witness for the incident and further permit a user's own multimedia to the sent to the PS server and/or retrieved by the PS server. The multimedia may be recorded directly within a securely built application, so that it is considered as sufficiently trusted to be used as evidence. Hence, video footage accompanied by metadata from the registered civilian communication device may be tagged as evidence within the PS server.

The civilian communication device may also receive incident status notifications, to which comments pertaining to the incident may be added. The incident status notifications may include later witness notifications, notifying the civilian to court dates or scheduling follow-up questioning or depositions. The public safety server may also upload an application to the registered civilian communication device to provide an interactive user interface displaying parameters to be filmed or photographed. For example, comments or annotations may be generated by the PS server and sent back to the civilian device—such as "zoom in here" "refocus on bumper", "request footage from different vantage point/back wall" This footage may further support images taken by BWCs which may be blocked or blurry. The body worn camera of the officer is typically worn at the shoulder and thus may miss some images while an officer is moving or in an awkward position (bent down, running, object in blocking part of the video, to name a few). Hence, the server analytics may identify footage of interest, and the server may send video focus instructions to the civilian communication device to gather additional video footage which may be later compiled to fill missed BWC footage. The use of video streaming as well as video recording may be applied to the embodiments. The video focus instructions may include sending a portion of the footage of interest to the civilian communication device having access permissions, to facilitate identifying the area of interest. The ability of the PS server to reach out to registered civilian as potential witnesses, and also to obtain footage from the civilian device, and/or further direct footage to be taken by the civilian device will greatly improve the review of the incident scene for evidence and operating procedures.

In some embodiments, the registration permissions may include initiation of communication between the civilian device and a BWC at an incident. For example, the automated monitoring, by the registered civilian device, of public safety body worn camera (BWC) activation and deactivation, and may further include remote activation of deactivated one or more BWCs. Hence, the monitored activation and deactivation activity of the BWC is a useful parameter for both on-incident operations and post incident process review. Allowing the registered civilian device to activate a deactivated BWC at an incident will improve the PS server incident scene video analytics and improve alignment with certain operating procedures that recommend or require that the BWC be activated.

As previously mentioned, the civilian communication device of the various embodiments may also be registered across a plurality of agencies over different jurisdictions. For example, the PS server 106 may include a feature, through which it can share registration data with participating agencies (with civilian permission), thereby enabling civilian communication devices, once registered with one agency, to work across other agencies. Based on the location of the incident, the PS server may select a jurisdictional profile associated with an agency of that current incident location. Updates can then be sent to the civilian communication device based on the selected jurisdictional profile. The civilian communication device may be registered to jurisdiction profiles that may include, but are not limited to, home agency, one or more county agencies, one or more state agencies, and/or one or more country agencies. The civilian communication device may be configured for one or more jurisdictional profiles that may be set as a default profile. Different civilian communication devices may have different default profiles. For example, a registered civilian communication device associated with a user who travels throughout the country may be assigned a default profile covering a wider range of agency jurisdictions, than a device associated with a user who remains local to the home agency.

As should be appreciated from the detailed description above, the operations and functions of the civilian communication device, public safety server and system are sufficiently complex as to require their implementation on a computer system, and cannot be performed, as a practical matter, in the human mind. The devices such as set forth herein are understood as requiring and providing speed and accuracy and complexity management that are not obtainable by human mental steps, (e.g., a human mind cannot interface directly with data storage, cannot transmit or receive electronic messages, electronically encoded audio, etc., and cannot remotely control activation of a currently deactivated public safety communication device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics; and
wherein the multimedia footage obtained by the registered civilian communication device is compiled by the PS server to fill in multimedia footage gaps caused by a deactivated PS device.

2. The method of claim 1, wherein the automated monitoring of PS communication device activation and deactivation includes monitoring, by the civilian communication device, activation and deactivation of public safety body worn cameras (PS BWCs) at the incident scene.

3. The method of claim 1, wherein the registered civilian communication device remotely triggers activation of a currently deactivated public safety body worn camera (PS BWC) at the incident scene.

4. The method of claim 1, wherein the civilian communication device automatically activates a deactivated public safety body worn camera (PS BWC) at the incident scene in response to a trigger from the PS server.

5. The method of claim 4, wherein the trigger by the PS server is based on real-time incident analytics performed by the PS server.

6. The method of claim 5, wherein the real-time incident analytics performed by the PS server are performed on video footage obtained by the civilian communication device and communicated to the PS server in conjunction with video footage of the activated PS BWC.

7. The method of claim 1, wherein recorded video footage with accompanied metadata from the registered civilian communication device is tagged as evidence within the PS server.

8. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics, and wherein recorded video footage with accompanied metadata from a plurality of registered civilian communication devices having the assigned incident ID is compiled and tagged as evidence within the server identifying witness and contact information from the metadata.

9. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics; and
wherein recorded video footage with accompanied metadata from a plurality of registered civilian communication devices is compiled and video analytics performed thereon at the PS server and compared to standard operating procedures (SOPs) associated with the PS agency.

10. The method of claim 1, further comprising:
sending automated incident status updates from the PS server to the plurality civilian communication devices based on the incident analytics.

11. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics; and
wherein the incident analytics performed by the server include monitoring compliance with SOP procedures.

12. The method of claim 11, wherein the incident analytics include monitoring activation and deactivation of PS BWCs at the incident scene to determine SOP compliance.

13. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics; and
automatically revoking access permission to the civilian communication device in response exceeding an invalid incident ID request threshold.

14. A method of engaging civilian participation in at an incident scene, comprising:
registering a civilian communication device with a public safety (PS) server of a public safety (PS) agency;
granting access permission, from the PS server, for the registered civilian communication device to communicate with predetermined elements of the PS agency;
requesting, by the civilian communication device, an incident ID assignment from the PS server, the request containing device metadata identifying time, date, and incident location, and the request further including at least one of:
self-identification of a civilian associated with the civilian communication device as a witness to an incident scene;
availability of multimedia footage pertaining to the incident scene;
receiving, at the civilian communication device, the assigned incident ID for the incident scene;
retrieving incident information, by the civilian communication device, based on access permissions granted for the assigned incident ID, the retrieved incident information including automated monitoring of PS communication device activation and deactivation;
transmitting the retrieved incident information back to the server for incident analytics;
identifying footage of interest, by the incident analytics; and
sending video focus instructions to the civilian communication device to gather additional video footage.

15. The method of claim 14, wherein the video focus instructions include sending at least a portion of the footage of interest to the civilian communication device having access permissions.

16. A communication system, comprising:
a civilian communication device comprising a processor, transmitter, receiver, video camera, and interactive user interface the processor being configured to:
register the civilian communication device, via the interactive user interface, with a public safety server associated with a public safety agency for incident scene facilitation;
receive access permission, granted by the PS server, to monitor and communicate with predetermined elements of the PS agency, wherein the processor of the civilian communication device is further configured to:
request an incident ID assignment from the PS server, the request containing:
device metadata identifying time, date, and incident location, self-identification of the civilian as a witness to an incident scene and availability of multimedia footage pertaining to the incident scene;
receive the incident ID assignment for the incident scene;
retrieve incident information based on the access permission granted for the incident ID, the retrieved incident information including automated monitoring of PS device activation/deactivation;
transmit the incident ID in conjunction with retrieved incident information back to the PS server for incident analytics; and
wherein the automated monitoring by the civilian communication device includes automated monitoring of a public safety body worn camera (PS BWC) activation and deactivation, and
wherein the automated monitoring of the PS BWC activation/deactivation is automatically reported to the PS server by the civilian communication device to compare to a standard operating procedure (SOP) based on an incident type.

17. A communication system, comprising:
a public safety (PS) server comprising a processor, transmitter, receiver, and multimedia manager, the processor being configured to:
register a civilian communication device with the public safety server;
grant access permission for the registered civilian communication device to communicate with predetermined elements of a PS agency associated with the PS server;
receive a request for incident ID assignment, from the registered civilian communication device, the incident ID request including civilian device metadata identifying time, date, and incident location, and further including self-identification of the civilian as a witness to an incident scene and availability of multimedia footage pertaining to the incident scene;
assign an incident ID, to the registered civilian device, in response to the request;
receive incident information tagged with the incident ID from the civilian communication device, the incident information including monitored data of automated monitoring of PS device activation/deactivation information;
performing analytics on the PS device activation/deactivation; and
wherein the PS device comprises a public safety body worn camera (PS BWC) and the analytics include comparing PS BWC activation/deactivation to a standard operating procedure (SOP).

18. The communication system of claim 17, wherein the registered civilian communication device remotely activates a currently deactivated public safety body worn camera (PS BWC).

19. A communication system, comprising:
a public safety (PS) server comprising a processor, transmitter, receiver, and multimedia manager, the processor being configured to:
register a civilian communication device with the public safety server;
grant access permission for the registered civilian communication device to communicate with predetermined elements of a PS agency associated with the PS server,
receive a request for incident ID assignment, from the registered civilian communication device, the incident ID request including civilian device metadata identifying time, date, and incident location, and further including self-identification of the civilian as a witness to an incident scene and availability of multimedia footage pertaining to the incident scene;
assign an incident ID, to the registered civilian device, in response to the request;
receive incident information tagged with the incident ID from the civilian communication device, the incident information including monitored data of automated monitoring of PS device activation/deactivation information;
performing analytics on the PS device activation/deactivation; and
wherein the public safety server registers the civilian communication device with additional PS agencies of different jurisdictions.

20. A method of engaging civilian participation at an incident scene investigation, comprising:
registering a civilian communication device with a public safety server of a public safety agency;
granting access permission, from the PS server, for the registered civilian device to remotely control activation of a deactivated public safety device at the incident scene; and
wherein multimedia footage of the incident scene taken by the registered civilian communication device is compiled by the PS server to fill in multimedia gaps of the deactivated public safety device.

21. The method of claim 20, wherein the deactivated public safety device comprises a deactivated public safety camera device at the incident scene.

22. The method of claim 21, wherein the deactivated public safety camera device comprises at least one of a deactivated public safety body worn camera and an in-vehicle camera.

23. A method of engaging civilian participation at an incident scene investigation, comprising:
registering a civilian communication device with a public safety server of a public safety agency;
granting access permission, from the PS server, for the registered civilian device to remotely control activation of a deactivated public safety device at the incident scene; and
wherein the public safety server further registers the civilian communication device with other public safety agencies of other jurisdictions.

\* \* \* \* \*